US009110202B2

(12) United States Patent
Um

(10) Patent No.: US 9,110,202 B2
(45) Date of Patent: Aug. 18, 2015

(54) OPTICAL MEMBER, DISPLAY DEVICE INCLUDING THE SAME, AND METHOD OF FABRICATING THE SAME

(75) Inventor: Kee Tae Um, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 265 days.

(21) Appl. No.: 13/242,516

(22) Filed: Sep. 23, 2011

(65) Prior Publication Data

US 2012/0075837 A1    Mar. 29, 2012

(30) Foreign Application Priority Data

Sep. 27, 2010    (KR) .................. 10-2010-0093399

(51) Int. Cl.

| F21V 9/00 | (2006.01) |
|---|---|
| F21V 8/00 | (2006.01) |
| B29C 45/14 | (2006.01) |
| B29L 11/00 | (2006.01) |
| B29L 31/34 | (2006.01) |
| G02F 1/1335 | (2006.01) |

(52) U.S. Cl.
CPC ......... *G02B 6/0023* (2013.01); *B29C 45/14819* (2013.01); *B29L 2011/00* (2013.01); *B29L 2031/3475* (2013.01); *G02B 6/0065* (2013.01); *G02B 6/0068* (2013.01); *G02B 6/0073* (2013.01); *G02F 2001/133614* (2013.01); *Y10T 428/239* (2015.01); *Y10T 428/2938* (2015.01)

(58) Field of Classification Search
CPC ... G02B 6/0023; G02B 6/0073; G02B 6/0065
USPC ............... 362/293, 84, 230–235, 608; 349/59
See application file for complete search history.

(56) References Cited

U.S. PATENT DOCUMENTS

| 7,367,691 | B2 * | 5/2008 | Lin ................................ 362/293 |
| 7,481,562 | B2 * | 1/2009 | Chua et al. .................... 362/612 |
| 8,008,850 | B2 * | 8/2011 | Su et al. ......................... 313/498 |
| 2006/0189104 | A1 | 8/2006 | Yan |
| 2009/0059554 | A1 * | 3/2009 | Skipor et al. ..................... 362/29 |
| 2009/0231833 | A1 * | 9/2009 | Miki et al. ....................... 362/84 |
| 2009/0237916 | A1 * | 9/2009 | Park ............................ 362/97.1 |
| 2010/0053930 | A1 | 3/2010 | Kim et al. |
| 2010/0123855 | A1 * | 5/2010 | Shin ................................ 349/61 |
| 2010/0157406 | A1 | 6/2010 | Gruhlke et al. |
| 2011/0037926 | A1 | 2/2011 | Tsukahara et al. |

(Continued)

FOREIGN PATENT DOCUMENTS

| JP | 2006-343409 A | 12/2006 |
| JP | 2009-283441 A | 12/2009 |

(Continued)

OTHER PUBLICATIONS

Office Action dated Aug. 28, 2012 in Japanese Application No. 2011-210247, filed Sep. 27, 2011.

(Continued)

*Primary Examiner* — Anh Mai
*Assistant Examiner* — Jessica M Apenteng
(74) *Attorney, Agent, or Firm* — Saliwanchik, Lloyd & Eisenschenk

(57) ABSTRACT

Provided are an optical member, a display device including the same, and a method of fabricating the same. The optical member includes: a matrix; a plurality of wavelength conversion particles in the matrix; and a protective layer surrounding the matrix.

3 Claims, 11 Drawing Sheets

(56) References Cited

U.S. PATENT DOCUMENTS

| | | |
|---|---|---|
| 2011/0240960 A1 | 10/2011 | Kim et al. |
| 2012/0113671 A1* | 5/2012 | Sadasivan et al. ............ 362/602 |

FOREIGN PATENT DOCUMENTS

| | | |
|---|---|---|
| JP | 2010-061098 A | 3/2010 |
| KR | 10-2010-0027891 A | 3/2010 |

OTHER PUBLICATIONS

Notice of Allowance dated May 29, 2012 in Korean Application No. 10-2010-0093399, filed Sep. 27, 2010.

Office Action dated May 21, 2013 in Japanese Application No. 2011-210247, filed Sep. 27, 2011.

* cited by examiner

OPTICAL MEMBER, DISPLAY DEVICE INCLUDING THE SAME, AND METHOD OF FABRICATING THE SAME

CROSS-REFERENCE TO RELATED APPLICATION

This application claims the benefit under 35 U.S.C. §119 of Korean Patent Application No. 10-2010-0093399, filed on Sep. 27, 2010, which is hereby incorporated by reference in its entirety.

BACKGROUND

The present disclosure relates to an optical member, a display device including the same, and a method of fabricating the same.

A light emitting diode (LED) is a semiconductor device converting electricity into ultraviolet rays, visible rays, and infrared rays through characteristics of a compound semiconductor and is mainly used for home appliances, remote controllers, and large billboards.

A high luminous LED light source is used for a lighting and replaces general incandescent and fluorescent lamps in terms of energy conservation, environmental protection, and cost cutting because it has low replacement costs due to high energy efficiency and a long life cycle, is resistant to vibration and impact, and does not requires toxic substances such as mercury.

Moreover, the LED is highly advantageous to a light source of a large-sized Liquid Crystal Display (LCD) TV and monitor. Compared to a Cold Cathode Fluorescent Lamp (CCFL) used in a general LCD, the LED has the excellent degree of color purity, low power consumption, and simple miniaturization. Therefore, products with the LED are mass-produced and studies for the LED are in progress more actively.

Recently, many techniques for realizing white light using a blue LED and a quantum dot (QD) as a fluorescent substance to emit red light and green light are introduced. This is because that white light realized with a QD has high brightness and excellent color reproducibility.

However, when the above techniques are applied to an LED backlight unit, studies for reducing light loss and improving color uniformity are still necessary.

BRIEF SUMMARY

Embodiments provide an optical member having improved reliability, a display device including the same, and a method of fabricating the same.

In one embodiment, an optical member includes: a matrix; a plurality of wavelength conversion particles in the matrix; and a protective layer surrounding the matrix.

In another embodiment, a display device includes: a light source; a wavelength conversion member to which a light emitted from the light source is incident; and a display panel to which a light emitted from the wavelength conversion member is incident, wherein the wavelength conversion member includes: a matrix; a plurality of wavelength conversion particles in the matrix; and a protective layer surrounding the matrix.

In further another embodiment, a method of fabricating an optical member includes: forming a matrix using a resin composition including a plurality of wavelength conversion particles; and forming a protective layer surrounding the matrix.

The details of one or more embodiments are set forth in the accompanying drawings and the description below. Other features will be apparent from the description and drawings, and from the claims.

DETAILED DESCRIPTION

Figure 1:
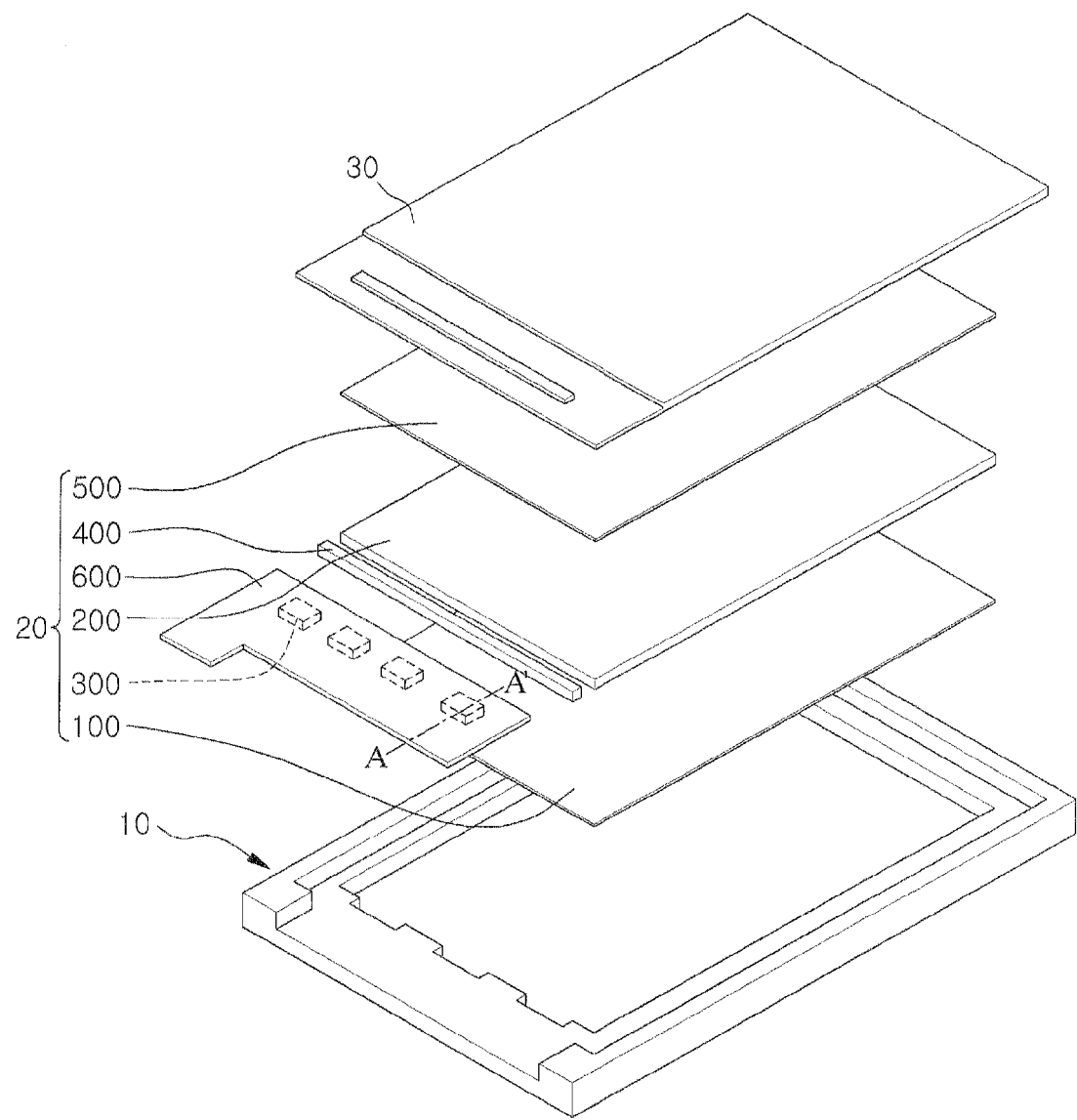
FIG. 1 is an exploded perspective view illustrating a liquid crystal display device according to an embodiment.

Reference will now be made in detail to the embodiments of the present disclosure, examples of which are illustrated in the accompanying drawings.

In addition, the terms "first" and "second" can be selectively or exchangeably used for the members. In the figures, a dimension of each of elements may be exaggerated for clarity of illustration, and the dimension of each of the elements may be different from an actual dimension of each of the elements. Not all elements illustrated in the drawings must be included and limited to the present disclosure, but the elements except essential features of the present disclosure may be added or deleted. Also, in the descriptions of embodiments, it will be understood that when a layer (or film), a region, a pattern, or a structure is referred to as being 'on/above/over/upper' substrate, each layer (or film), a region, a pad, or patterns, it can be directly on substrate each layer (or film), the region, the pad, or the patterns, or intervening layers may also be present. Further, it will be understood that when a layer is referred to as being 'under/below/lower' each layer (film), the region, the pattern, or the structure, it can be directly under another layer (film), another region, another pad, or another patterns, or one or more intervening layers may also be present. Therefore, meaning thereof should be judged according to the spirit of the present disclosure.

Figure 2:
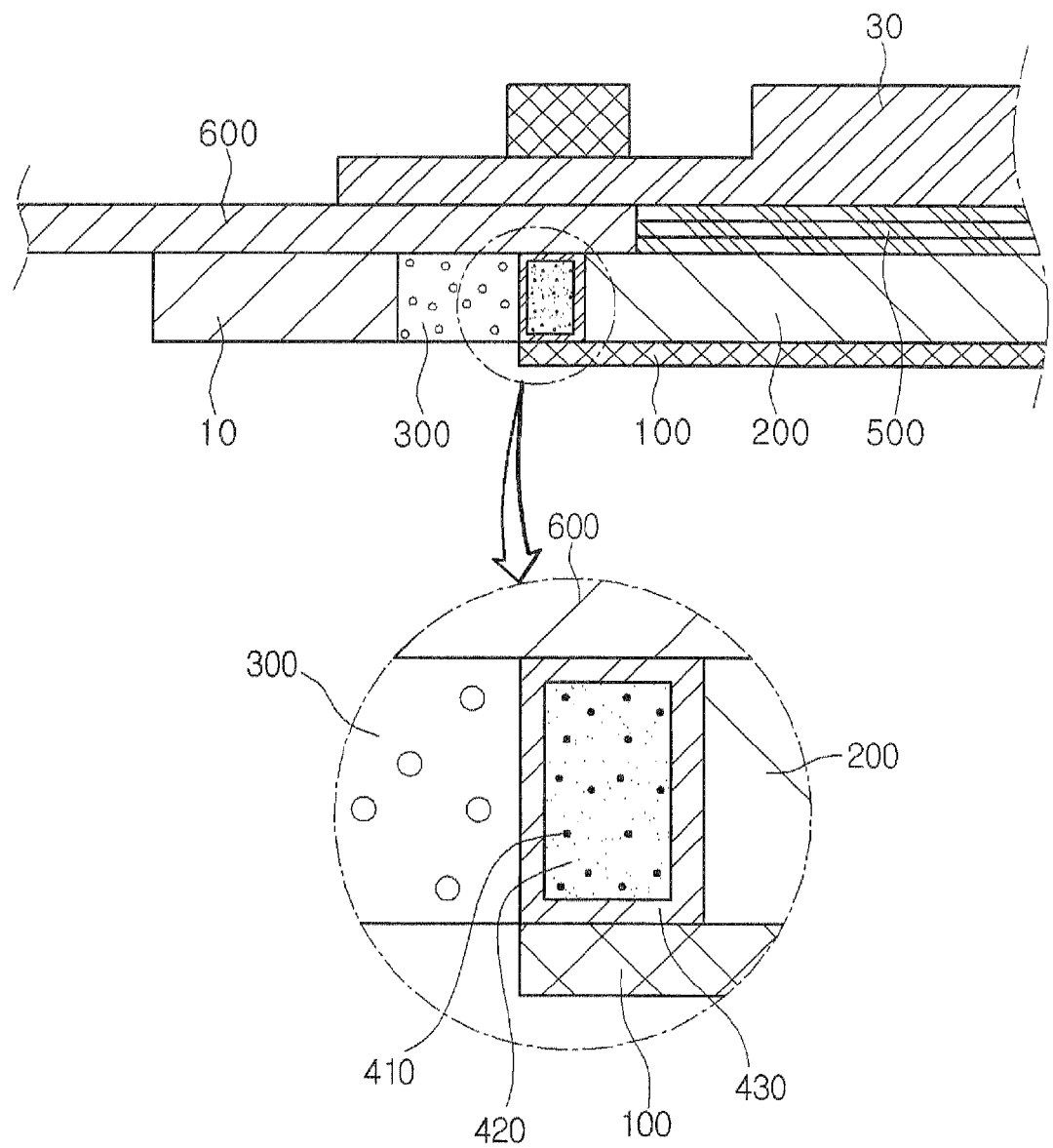
FIG. 2 is a sectional view taken along the line A-A' of FIG. 1.
Figure 3:
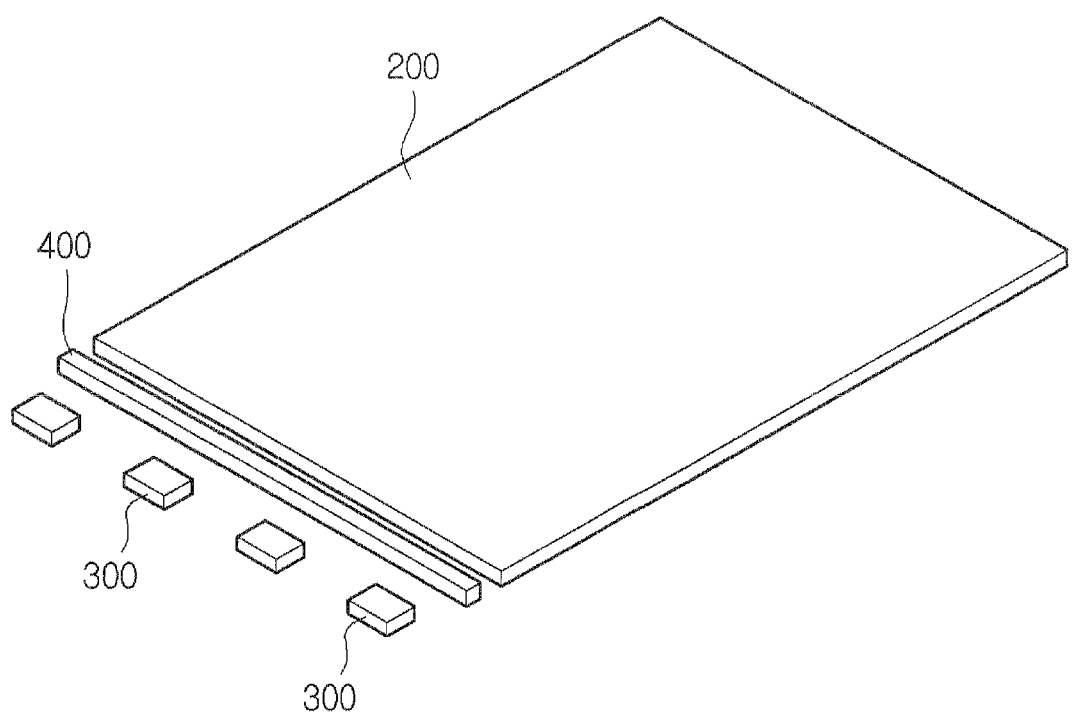
FIG. 3 is a perspective view illustrating a light emitting diode, a wavelength conversion member, and a light guide plate.
Figure 4:
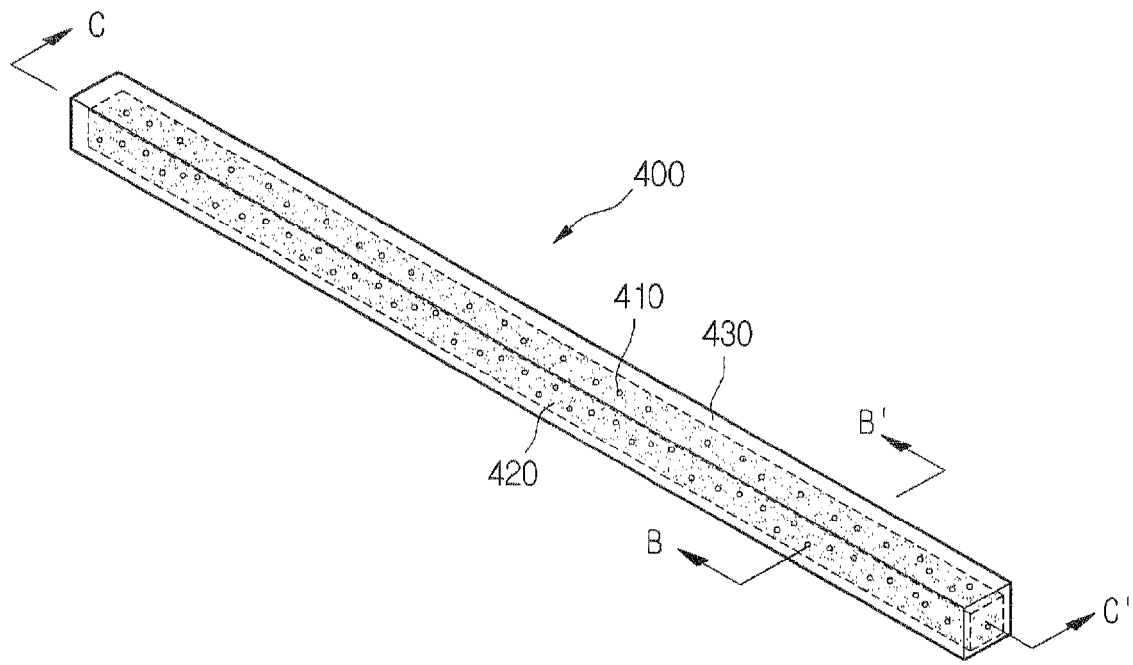
FIG. 4 is a perspective view illustrating a wavelength conversion member according to an embodiment.
Figure 5:
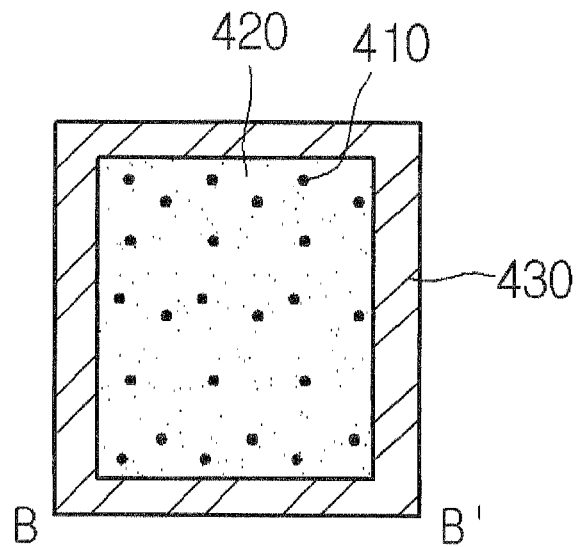
FIG. 5 is a sectional view taken along the line B-B' of FIG. 4.
Figure 6:
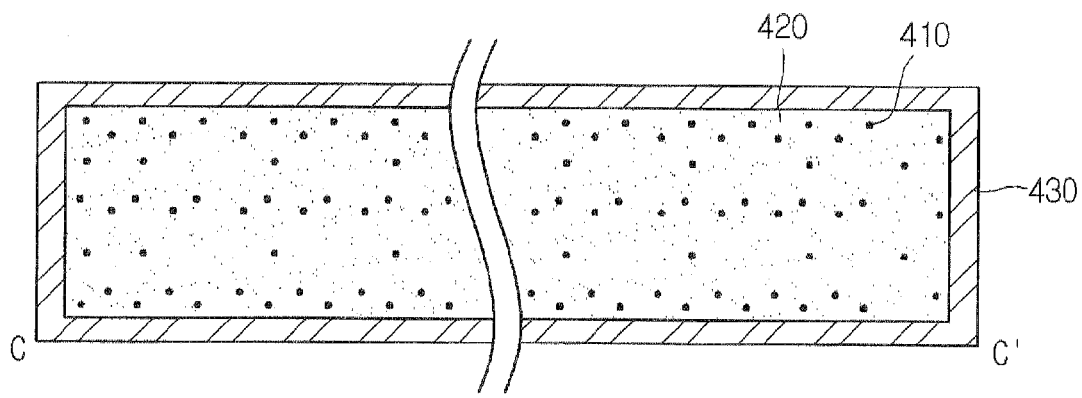
FIG. 6 is a sectional view taken along the line C-C' of FIG. 4.
Figure 12:
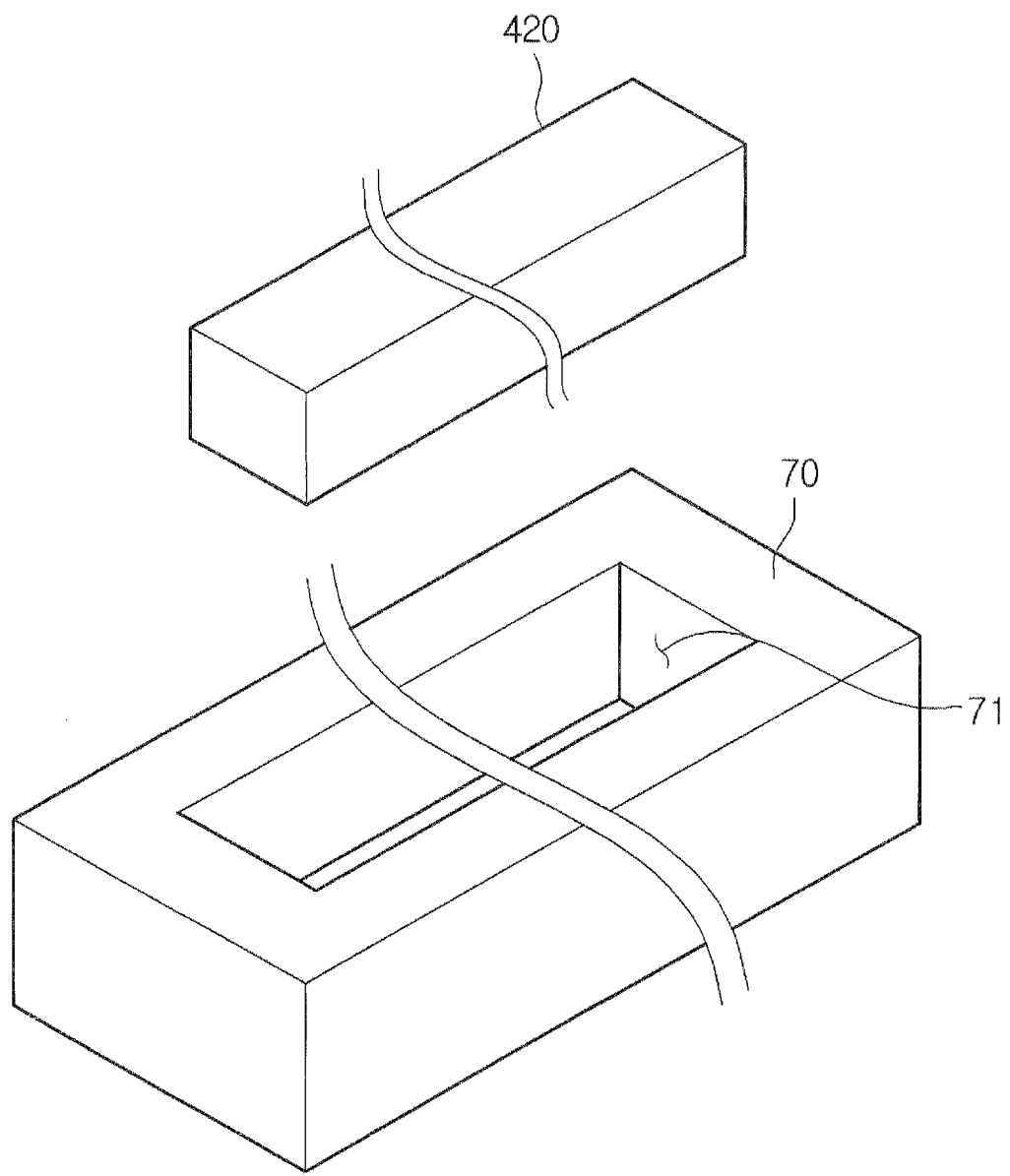
FIGS. 12 and 13 are views illustrating processes of fabricating a wavelength conversion member according to another embodiment.
Figure 13:
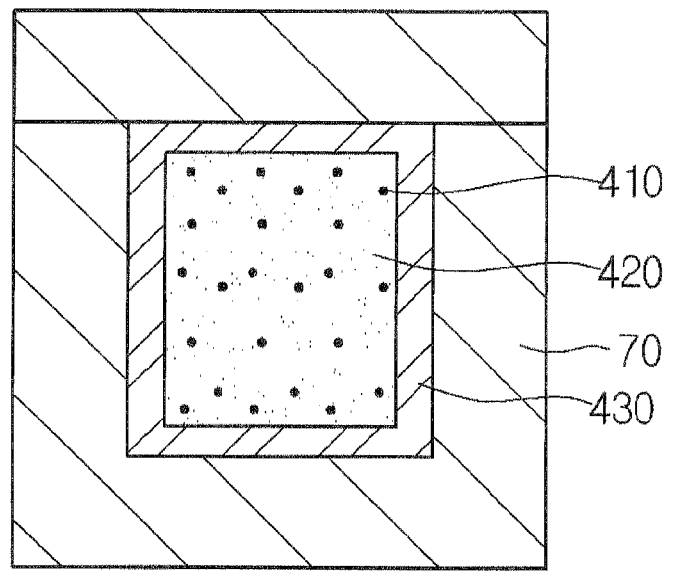
Figure 14:
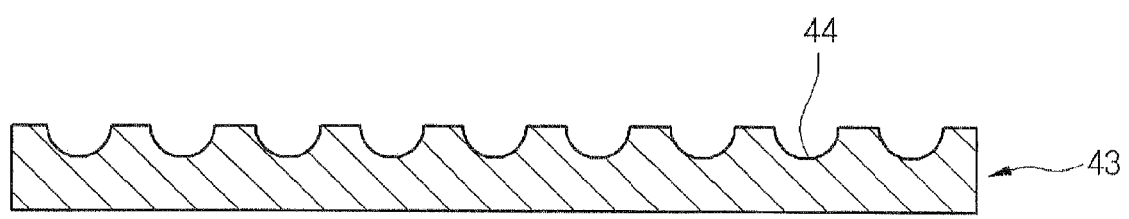
FIG. 14 is a sectional view illustrating another example of a mold for forming a wavelength conversion member according to an embodiment.
Figure 15:
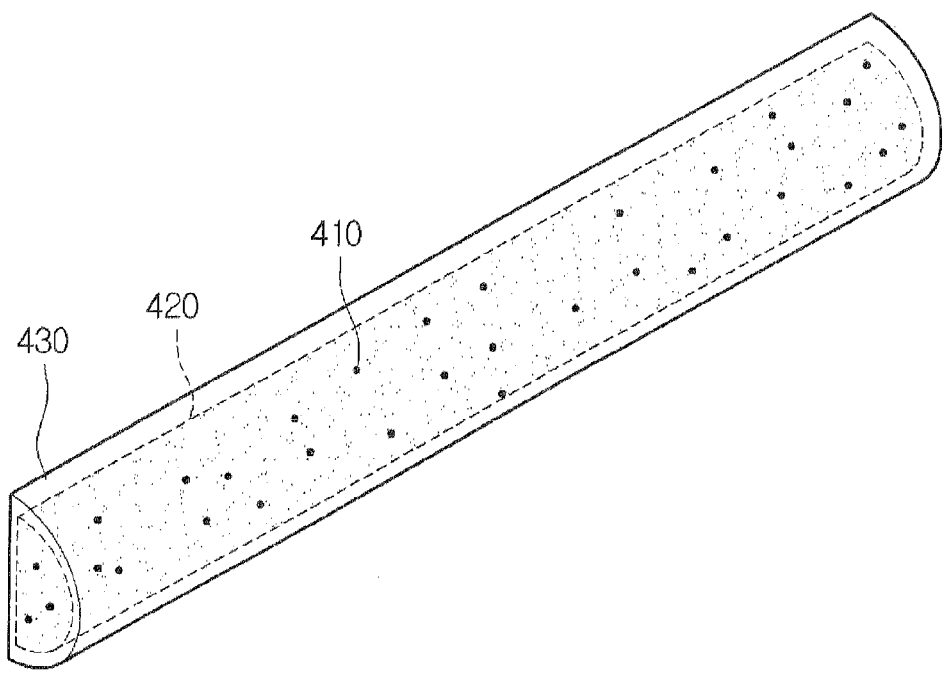
FIG. 15 is a perspective view illustrating a wavelength conversion member according to another embodiment.
Figure 16:
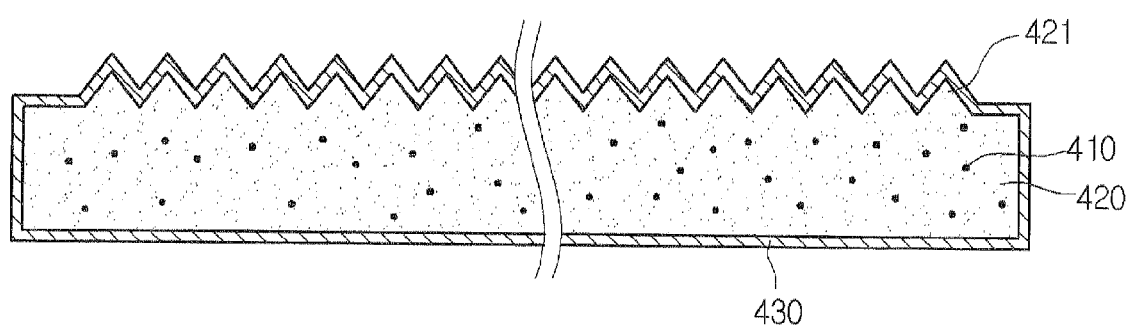
FIG. 16 is a sectional view illustrating one sectional side of a wavelength conversion member according to another embodiment.

FIG. 1 is an exploded perspective view illustrating a liquid crystal display device according to an embodiment. FIG. 2 is a sectional view taken along the line A-A' of FIG. 1. FIG. 3 is a perspective view illustrating a light emitting diode, a wavelength conversion member, and a light guide plate. FIG. 4 is a perspective view illustrating a wavelength conversion member according to an embodiment. FIG. 5 is a sectional view taken along the line B-B' of FIG. 4. FIG. 6 is a sectional view taken along the line C-C' of FIG. 4. FIGS. 7 to 11 are views illustrating processes of fabricating a wavelength conversion member. FIGS. 12 and 13 are views illustrating processes of fabricating a wavelength conversion member according to another embodiment. FIG. 14 is a sectional view illustrating another example of a mold for forming a wavelength conversion member according to an embodiment. FIG. 15 is a perspective view illustrating a wavelength conversion member according to another embodiment. FIG. 16 is a sectional view illustrating one sectional side of a wavelength conversion member according to another embodiment.

Referring to FIGS. 1 to 6, the liquid crystal display device according to an embodiment includes a mold frame 10, a backlight assembly 20, and a liquid crystal panel 30.

The mold frame 10 receives the backlight assembly and the liquid crystal panel 30. The mold frame 10 has a rectangular frame form and is formed of plastic or enhanced plastic.

Additionally, a chassis surrounding the mold frame 10 and supporting the backlight assembly 20 may be disposed below the mold frame 10. The chassis may be disposed at a side of the mold frame 10.

The backlight assembly 20 is disposed in the mold frame 10 and generates and projects a light toward the liquid crystal panel 30. The backlight assembly 20 includes a reflective sheet 100, a light guide plate 200, a light emitting diode 300, and a wavelength conversion member 400, a plurality of optical sheets 500, and a Flexible Printed Circuit Board (FPCB) 600.

The reflective sheet 100 reflects the light generated from the light emitting diode 300 toward an upper direction.

The light guide plate 200 is disposed on the reflective sheet 100 and receives an incident light from the light emitting diode 300 to reflect the received light to an upper direction through reflection, refraction, and scattering.

The light guide plate 200 includes an incident side toward the light emitting diode 300. That is, among the sides of the light guide plate 200, a side toward the light emitting diode 300 is the incident side.

The light emitting diode 300 is disposed on the side of the light guide plate 200. In more detail, the light emitting diode 300 is disposed on the incident side.

The light emitting diode 300 is a light source generating light. In more detail, the light emitting diode 300 emits light toward the wavelength conversion member 400.

The light emitting diode 300 may be a blue light emitting diode generating blue light or an UV light emitting diode generating ultraviolet ray. That is, the light emitting diode 300 may generate a blue light having a wavelength band of about 400 nm to about 470 nm or an ultraviolet ray having a wavelength band of about 300 nm to about 400 nm.

The light emitting diode 300 is mounted on the FPCB 600. The light emitting diode 300 is disposed below the FPCB 600. The light emitting diode 300 receives a drive signal through the FPCB 600.

As shown in FIGS. 1 to 3, the wavelength conversion member 400 is interposed between the light emitting diode 300 and the light guide plate 200. The wavelength conversion member 400 adheres to the side of the light guide plate 200. In more detail, the wavelength conversion member 400 adheres to the incident side of the light guide plate 200. Moreover, the wavelength conversion member 400 may adhere to the light emitting diode 300.

The wavelength conversion member 400 receives a light emitted from the light emitting diode 300 and changes a wavelength of the received light. For example, the wavelength conversion member 400 may convert a blue light emitted from the light emitting diode 300 into green light and red light. That is, the wavelength conversion member 400 may convert a portion of the blue light into a green light having a wavelength band of about 520 nm to about 560 nm and another part of the blue light into a red light having a wavelength band of about 630 nm to about 660 nm.

Additionally, the wavelength conversion member 400 converts an ultraviolet ray emitted from the light emitting diode 300 into blue light, green light, and red light. That is, the wavelength conversion member 400 may convert a portion of the ultraviolet ray into a blue light having a wavelength band of about 400 nm to about 470 nm, another part of the ultraviolet ray into a green light having a wavelength band of about 520 nm to about 560 nm, and another part of the ultraviolet ray into a red light having a wavelength band of about 630 nm to about 660 nm.

Accordingly, a light passing through the wavelength conversion member 400 and lights converted by the wavelength conversion member 400 may form white light. That is, blue light, green light, and red light are combined to form white light incident to the light guide plate 200. That is, the wavelength conversion member 400 is an optical member changing or improving characteristics of an incident light.

As shown in FIGS. 4 to 6, the wavelength conversion member 400 includes a plurality of wavelength conversion particles 410, a matrix 420, and a protective layer 430.

The wavelength conversion member 400 is disposed in the matrix 420. In more detail, the wavelength conversion particles 410 are uniformly distributed on the matrix 420. That is, the wavelength conversion particles 410 may be inserted into the matrix 420.

The wavelength conversion particles 410 change the wavelength of a light emitted from the light emitting diode 300. The wavelength conversion particles 410 receive light emitted from the light emitting diode 300 and convert its wavelength. For example, the wavelength conversion particles 410 may convert a blue light emitted from the light emitting diode 300 into green light and red light. That is, a portion of the wavelength conversion particles 410 converts the blue light into a green light having a wavelength of about 520 nm to about 560 nm. Another portion of the wavelength conversion particles 410 converts the blue light into a red light having a wavelength of about 630 nm to about 660 nm.

Unlike this, the wavelength conversion particles 410 may convert the ultraviolet ray emitted from the light emitting diode 300 into blue light, green light, and red light. That is, a portion of the wavelength conversion particles 410 converts the ultraviolet into a blue light having a wavelength of about 400 nm to about 470 nm. Another portion of the wavelength conversion particles 410 converts the ultraviolet into a green light having a wavelength of about 520 nm to about 560 nm. Another portion of the wavelength conversion particles 410 converts the ultraviolet into a red light having a wavelength of about 630 μm to about 660 nm.

That is, when the light emitting diode 300 is a blue light emitting diode generating blue light, the wavelength conversion particles 410 converting a blue light into green light and red light may be used. Unlike this, when the light emitting diode 300 is an UV light emitting diode generating ultraviolet ray, the wavelength conversion particles 410 converting an ultraviolet ray into blue light, green light, and red light may be used.

The wavelength conversion particles 410 may be a plurality of Quantum Dots (QDs). The QDs may include core nano crystal and a skin nano crystal surrounding the core nano crystal. Additionally, the QDs may include an organic ligand combined to the skin nano crystal. Additionally, the QDs may include an organic coating layer surrounding the skin nano crystal.

The skin nano crystal may include more than two layers. The skin nano crystal is formed on the surface of the core nano crystal. The QDs allow a wavelength of light incident to the core nano crystal to be longer through the skin nano crystal forming a skin layer and improve light efficiency.

The QDs may include at least one of a group II compound semiconductor, a group III compound semiconductor, a group V compound semiconductor, and a group VI compound semiconductor. In more detail, the core nano crystal may include Cdse, InGaP, CdTe, CdS, ZnSe, ZnTe, ZnS, HgTe or HgS. Additionally, the skin nano crystal may include CuZnS, CdSe, CdTe, CdS, ZnSe, ZnTe, ZnS, HgTe or HgS. The diameters of the QDs may be about 1 nm to about 10 nm.

The wavelength of a light emitted from the QDs may be adjusted according to the sizes of the QDs. The organic ligand may include pyridine, mercapto alcohol, thiol, phosphine, and phosphine oxide. The organic ligand stabilizes unstable QDs after chemical synthesis. After the chemical synthesis, a dangling bond is formed at the outline and, due to the dangling bond, the QDs may become unstable. However, one end of the organic ligand is in a dissociated state. The dissociated one end of the organic ligand is combined to the dangling bond to stabilize the QDs.

Especially, quantum confinement effect occurs in the QDs when the sizes of the QDs are less than the Bohr radius of an exciton including electrons and holes excited by light and electricity. The QDs have a sparse energy level and their energy gap sizes are changed. Moreover, charges are limited in the QDs so that high luminous efficiency is provided.

The QDs may have a varying fluorescent wavelength according to the size of a particle unlike a typical fluorescent dye. That is, when the size of a particle becomes smaller, a light having a short wavelength may be emitted and a fluorescent light of a visible ray band having a desired wavelength may be emitted by adjusting the size of a particle. Additionally, an extinction coefficient is about 100 to 1000 times greater than that of a typical dye and a quantum yield is high so that very intensive fluorescent light is generated.

The QDs may be synthesized through a chemical wet method. Here, the chemical wet method puts a precursor material in an organic solvent to grow particles. Thus, the QDs may be synthesized through chemical wet method.

The matrix 420 surrounds the wavelength conversion particles 410. That is, the matrix 420 scatters the wavelength conversion particles 410 uniformly. The matrix 420 may be formed of polymer. The matrix 420 is transparent. That is, the matrix 420 may be formed of transparent polymer.

In more detail, the matrix 420 may be formed of curable resin. That is, the matrix 420 may include thermocurable resin and/or photocurable resin. Additionally, the matrix 420 may include a thermocurable initiator and/or a photocurable initiator. Additionally, the matrix 420 may further include a crosslinking agent.

Silicon based resin, epoxy based resin, or acrylic based resin may be used for the matrix 420. In more detail, the matrix may be formed of polyimide, polysiloxane, polymethyl methacrylate (PMMA), or polycarbonate (PC).

The matrix 420 receives the wavelength conversion particles 410. Additionally, the matrix 420 may improve optical characteristics of the wavelength conversion particles 410. Additionally, the matrix 420 may protect the wavelength conversion particles 410 from external moisture and/or oxygen.

The matrix 420 may have a form extending in one direction. That is, the matrix 420 may extend along the incident side of the light guide plate 200. The matrix 420 may have a bar form. In more detail, the matrix 420 may have a square bar form. The present invention is not limited thereto and thus may have a circular pillar form, a semi-circular pillar form, or other polygonal pillar forms.

Moreover, the matrix 420 may have a uniform sectional form in the length direction. Unlike this, a sectional form of the matrix 420 may vary according to the length direction.

The matrix 420 may have a plane overall. That is, the outer side of the matrix 420 may have a plane overall. Unlike this, as shown in FIG. 15, the matrix 420 may have a curved side. That is, a portion of the outer side of the matrix 420 may be a curved side. Additionally, as shown in FIG. 16, the matrix 420 may have a plurality of protrusions 421. The protrusions 421 may have various forms such as a cone form (such as a circular cone and a polygonal cone), a pillar form, and an embossing form.

The protective layer 430 surrounds the matrix 420. In more detail, the protective layer 430 is disposed on the outer side of the matrix 420. The protective layer 430 is coated on the outer side of the matrix 420. The protective layer 430 may be entirely coated on the outer side of the matrix 420. That is, the protective layer 430 may seal the matrix 420 from the external.

The protective layer 430 may protect the wavelength conversion particles 410 and the matrix 420 from external physical impact and chemical impact. The protective layer 430 may be about 100 μm to about 1000 μm. If the protective layer 430 is too thin, for example, when the thickness of the protective layer 430 is less than about 100 μm, the protective layer 430 may not effectively prevent the penetration of an external moisture and/or oxygen. Additionally, if the protective layer 430 is too thick, for example, when the thickness of the protective layer 430 is more than about 1000 μm, optical characteristics such as transmittance of the wavelength conversion member 400 may be deteriorated.

The protective layer 430 is transparent. The protective layer 430 may have a high transmittance. The protective layer 430 includes polymer. The protective layer may have the same material as the matrix. Unlike this, the protective layer 430 may include a different material than the matrix 420.

Curable resin or thermoplastic resin may be used for the protective layer 430.

In more detail, the protective layer 430 may include thermocurable resin and/or photocurable resin. That is, the protective layer 430 is formed through a thermocurable/or photocurable process. Additionally, the protective layer 430 may further include a crosslinking agent. Acrylic based resin, epoxy based resin, urethane based resin, or silicon based resin may be used for the protective layer 430.

Thermoplastic resin may be used for the protective layer 430. For example, polyethyleneterephthalate (PET) may be used for the protective layer 430.

Additionally, the protective layer 430 may include a polymer or a copolymer having a unit expressed with Chemical Formula 1 below.

Chemical Formula 1

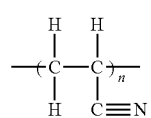

Here, n is 1 to 10000.

In more detail, the polymer or copolymer may be polyacylonitrile (PAN).

Additionally, the protective layer 430 may include a polymer or a copolymer having a unit expressed with Chemical Formula 2 below.

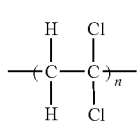

Chemical Formula 2

Here, n is 1 to 10000.

In more detail, the polymer or copolymer may be polyvinyliden chloride (PVDC).

Additionally, the protective layer 430 may include a polymer or a copolymer having a unit expressed with Chemical Formula 3 below.

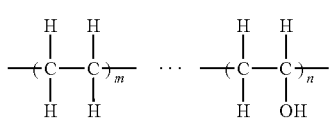

Chemical Formula 3

Here, n is 1 to 10000 and m is 1 to 10000.

In more detail, the polymer or copolymer may be ethylene vinylalcohol (EVOH).

The protective layer 430 is transparent and has a low moisture and/or oxygen transmittance.

The protective layer 430 may have a similar refractive index to the matrix 420. The refractive index of the protective layer 430 may correspond to that of the matrix 420. That is, the refractive index of the protective layer 430 may be substantially identical to that of the matrix 420.

Unlike this, the protective layer 430 may have a refractive index between the matrix 420 and the light guide plate 200. Accordingly, the protective layer 430 may perform an optical alleviation function between the matrix 420 and the light guide plate 200. Additionally, the protective layer 430 may have a refractive index between the refractive indices of the matrix 420 and a filling material of the light emitting diode 300. The protective layer 430 may perform an optical alleviation function between the matrix 420 and the light emitting diode 300.

Additionally, the protective layer 430 may have a lower refractive index than the matrix 420. In this case, the protective layer 430 may serve as an optical alleviation layer between the matrix 420 and a layer, for example, an air layer, adjacent to the matrix 420.

Like this, the protective layer 430 may protect the matrix 420 and the wavelength conversion particles 410 and also improves optical characteristics of a liquid crystal display device according to an embodiment.

Referring to FIGS. 7 to 11, the wavelength conversion member 400 may be formed through the following process.

Figure 7:
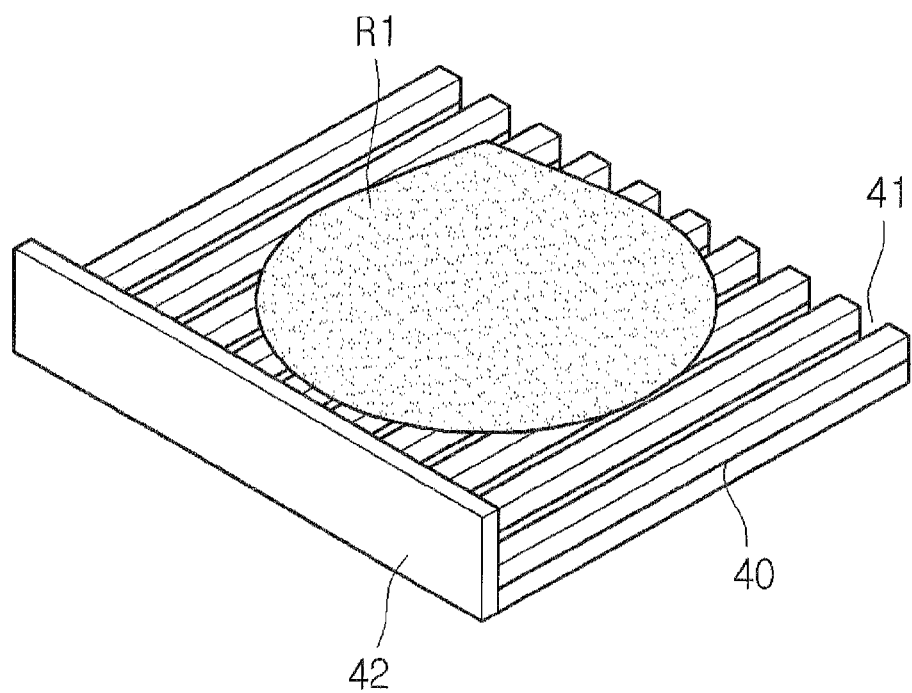
FIGS. 7 to 11 are views illustrating processes of fabricating a wavelength conversion member.

Referring to FIG. 7, a first mold 40 including a plurality of molding grooves 41 is provided. The plurality of molding grooves 41 are formed in the first mold 40. The molding grooves 41 extend in one direction. The molding grooves have a rectangular pillar form. Unlike this, as shown in FIG. 14, the molding grooves 41 may have a curved side.

Later, a first resin composition R1 having the uniformly scattered wavelength conversion particles 410 is provided. The first resin composition R1 may be filled in the molding grooves 41.

The first resin composition R1 may include thermocurable resin and/or thermocurable resin. Additionally, the first resin composition R1 may include a thermocurable initiator and/or a photocurable initiator. Moreover, the first resin composition R1 may further include a crosslinking agent.

The first resin composition R1 may include monomer, oilgomer, or polymer. The first resin composition R1 may include silicon based resin, epoxy based resin, or acrylic based resin.

Figure 8:
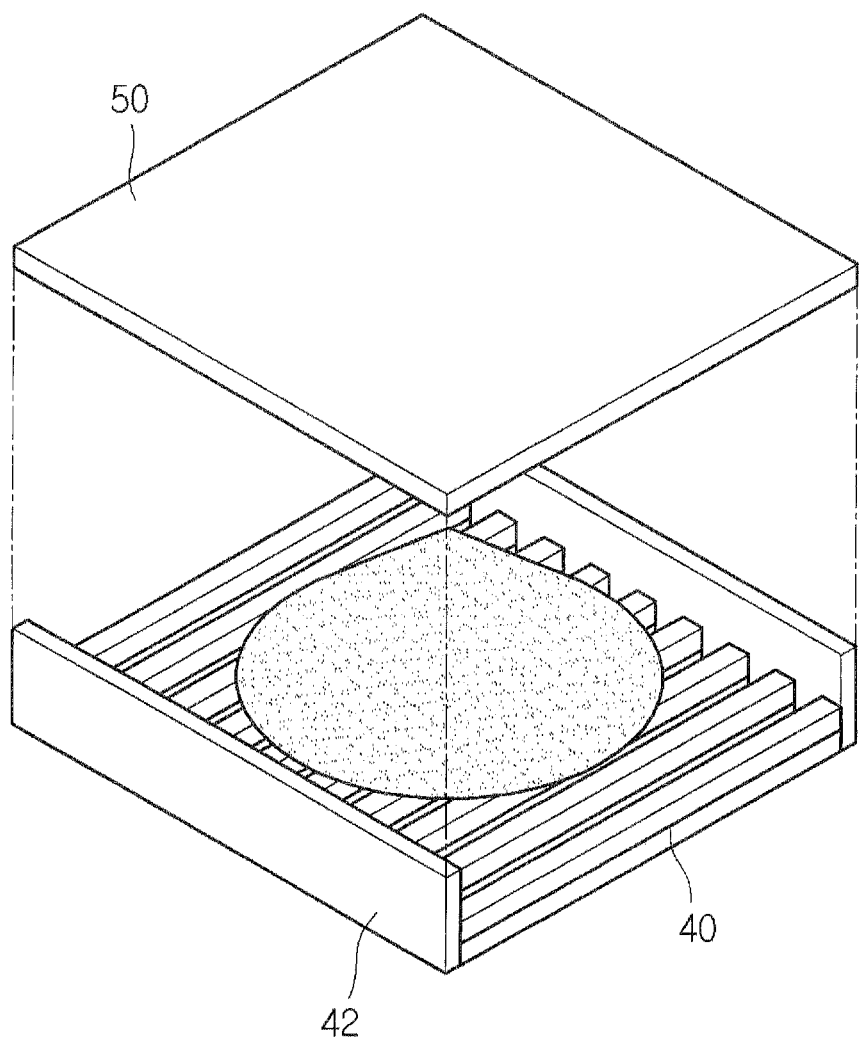

As shown in FIG. 8, a pressing plate 50 is disposed on the first mold 40. The pressing plate 50 may be formed of metallic material. Accordingly, heat may be applied to the first resin composition R1 through the pressing plate 50. Unlike this, the pressing plate 50 may be transparent. Therefore, ultraviolet ray may be projected on the first resin composition R1 through the pressing plate 50. At this point, the pressing plate 50 may selectively transmit ultraviolet ray. That is, since a mask pattern is disposed on the pressing plate 50, ultraviolet ray is transmitted through only an area corresponding to the molding grooves 41. Accordingly, the first resin composition R1 remaining on an area without the molding grooves 41 is not curable and only the first resin composition R1 filled in the molding grooves 41 is curable.

Additionally, pressure may be applied to the first resin composition R1 through the pressing plate 50.

Figure 9:
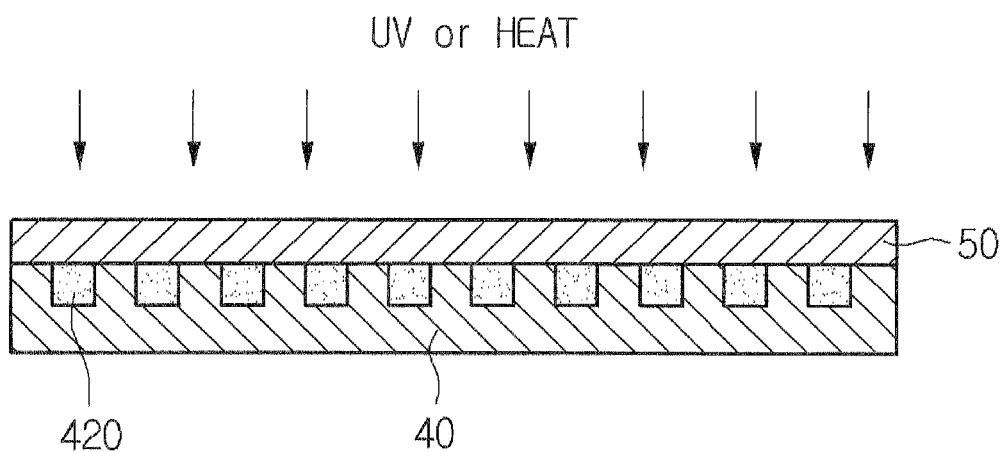

As shown in FIG. 9, the first resin composition R1 filled in the molding grooves 41 may be curable through heat and/or ultraviolet ray and a plurality of matrixes 420 are formed. At this point, while the wavelength conversion particles 410 are uniformly distributed, the first resin composition R1 is curable. Accordingly, the wavelength conversion particles 410 may be uniformly distributed.

Figure 10:
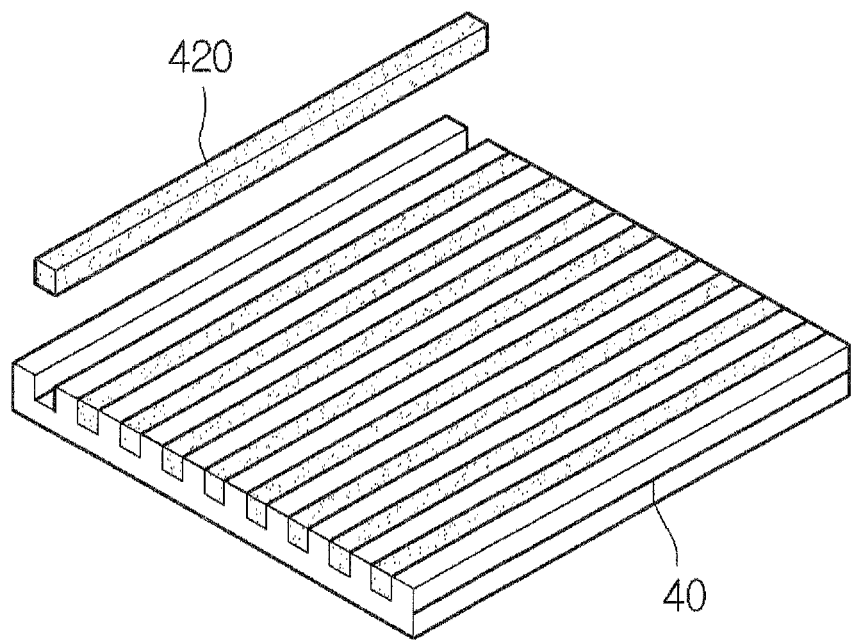

Referring to FIG. 10, the matrixes 420 are detached from the first mold 40. At this point, the side part 42 of the first mold 40 may be separable. Accordingly, the matrixes 420 may be easily detached from the first mold 40. Additionally, fluorinated coating or fluorinated diamond like carbon (FDLC) may be coated on the inside of the molding grooves 41 of the first mold 40.

Figure 11:
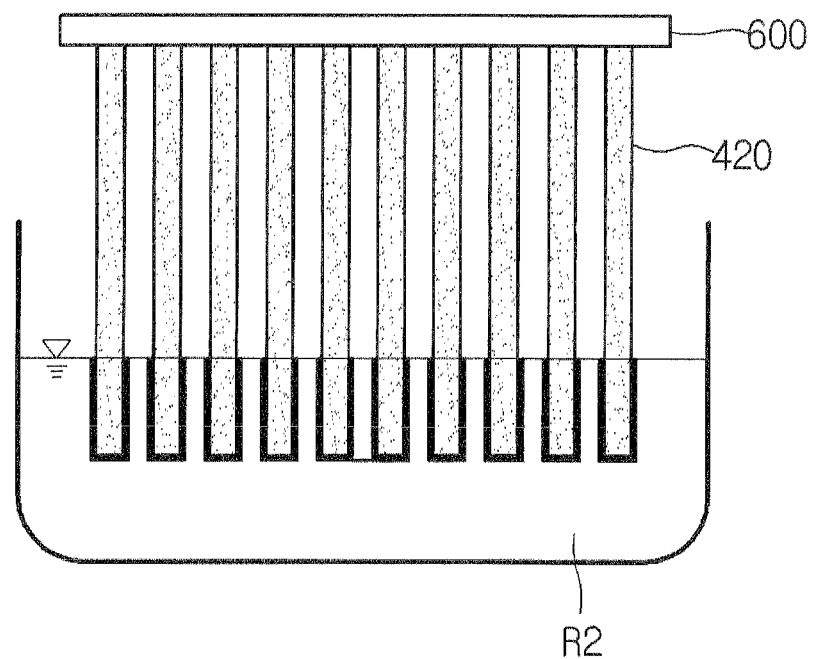

Referring to FIG. 11, a second resin composition R2 is coated on the external surface of the detached matrixes 420. The second resin composition R2 may be entirely coated on the external surface of the matrixes 420. The second resin composition R2 may be coated through various processes such as dipping coating or spray coating.

The second resin composition R2 may include a thermocurable resin and/or photocurable resin. Additionally, the second resin composition R2 may include thermocurable initiator and/or photocurable initiator. Additionally, the second resin composition R2 may further include a crosslinking agent.

The second resin composition R2 may include monomer, oilgomer, or polymer. The second resin composition R2 may include silicon based resin, epoxy based resin, or acrylic based resin.

Then, the coated second resin composition R2 is curable and the protective layer 430 is formed.

The protective layer 430 may be formed through an injection process.

Referring to FIG. 12, the matrix 420 is disposed on a second mold 70. The second mold 70 may have a larger injection groove 71 than the matrix 420. The matrix 420 is disposed on the injection groove 71.

Referring to FIG. 13, a melted thermoplastic resin is injected in the injection groove 71. The injected thermoplastic resin is cooled and the protective layer 430 is formed.

Like this, the protective layer 430 may be formed using thermoplastic resin through an injection process.

Like this, since the matrix 420 and the protective layer 430 are formed through a curable process and/or an injection process, they may be formed with various forms.

Especially, as shown in FIG. 14, the molding grooves of the second mold 43 may have a curved side 44. Accordingly, as shown in FIG. 15, the matrix 420 and the protective layer 430 may have a desired curved side. Additionally, as shown in FIG. 16, the matrix 420 and the protective layer 430 may include protrusions 421 and/or grooves of various forms.

Referring to FIGS. 1 to 4 again, the optical sheets 500 are disposed on the light guide plate 200. The optical sheets 500 improve characteristics of light transmitted.

The FPCB 600 may be electrically connected to the light emitting diode 300. The light emitting diode 300 may be mounted. The FPCB 600 is disposed in the mold frame 10. The FPCB 600 is disposed on the light guide plate 200.

The mold frame 100 and the backlight assembly 20 constitute a backlight unit. That is, the backlight unit includes the mold frame 100 and the backlight assembly 20.

The liquid crystal panel 30 is disposed in the mold frame 10 and is on the optical sheets 500.

The liquid crystal panel 30 displays an image by adjusting the intensity of transmitted light. That is, the liquid crystal panel 300 is a display panel displaying an image. The liquid crystal panel displays an image by using a light of a wavelength converted by the wavelength conversion member 400. The liquid crystal panel 30 may include a Thin Film Transistor (TFT) substrate, a color filter substrate, a liquid crystal layer interposed between the two substrates, and polarizing filters.

The protective layer 430 may effectively protect the wave conversion particles 410 from chemical impact such as external moisture and/or oxygen. Accordingly, a liquid crystal display device according to an embodiment may have improved durability and reliability.

Additionally, the matrix 420 and the protective layer 430 may include polymer. Accordingly, the wavelength conversion member 400 may be formed with various forms.

Additionally, the protective layer 430 may be easily formed through a coating process or an injection process. Especially, the protective layer 430 may be formed of a material having a high moisture blocking characteristic such as PVDC, EVOH, or PAN. Accordingly, an optical member according to an embodiment may have improved reliability and durability.

Additionally, the matrix 420 and/or the protective layer 430 may be easily formed with a desired form using a mold. Accordingly, the wavelength conversion member 400 having an improved optical characteristic may be easily manufactured.

Accordingly, a liquid crystal display device according to an embodiment may have an improved optical characteristic.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a light guide plate;
   a light source disposed at a lateral side of the light guide plate;
   a wavelength conversion member to which a light emitted from the light source is incident; and
   a display panel to which a light emitted from the wavelength conversion member is incident,
   wherein the wavelength conversion member comprises:
   a matrix;
   a plurality of Quantum Dots (QDs) in the matrix; and
   a protective layer surrounding the matrix,
   wherein the protective layer comprises ethylene vinylalcohol (EVOH), polyacylonitrile (PAN), polyvinyliden chloride (PVDC), or polyethyleneterephthalate (PET);
   wherein the wavelength conversion member is interposed between a light emitting diode and the light guide plate;
   wherein the protective layer has a refractive index with a value between that of the matrix and that of the light guide plate; and
   wherein the protective layer has a refractive index with a value between that of the matrix and that of a filling material of the light emitting diode.

2. The display device according to claim 1, wherein the matrix has a curved side.

3. The display device according to claim 1, wherein the matrix comprises silicon based resin.

* * * * *